UNITED STATES PATENT OFFICE.

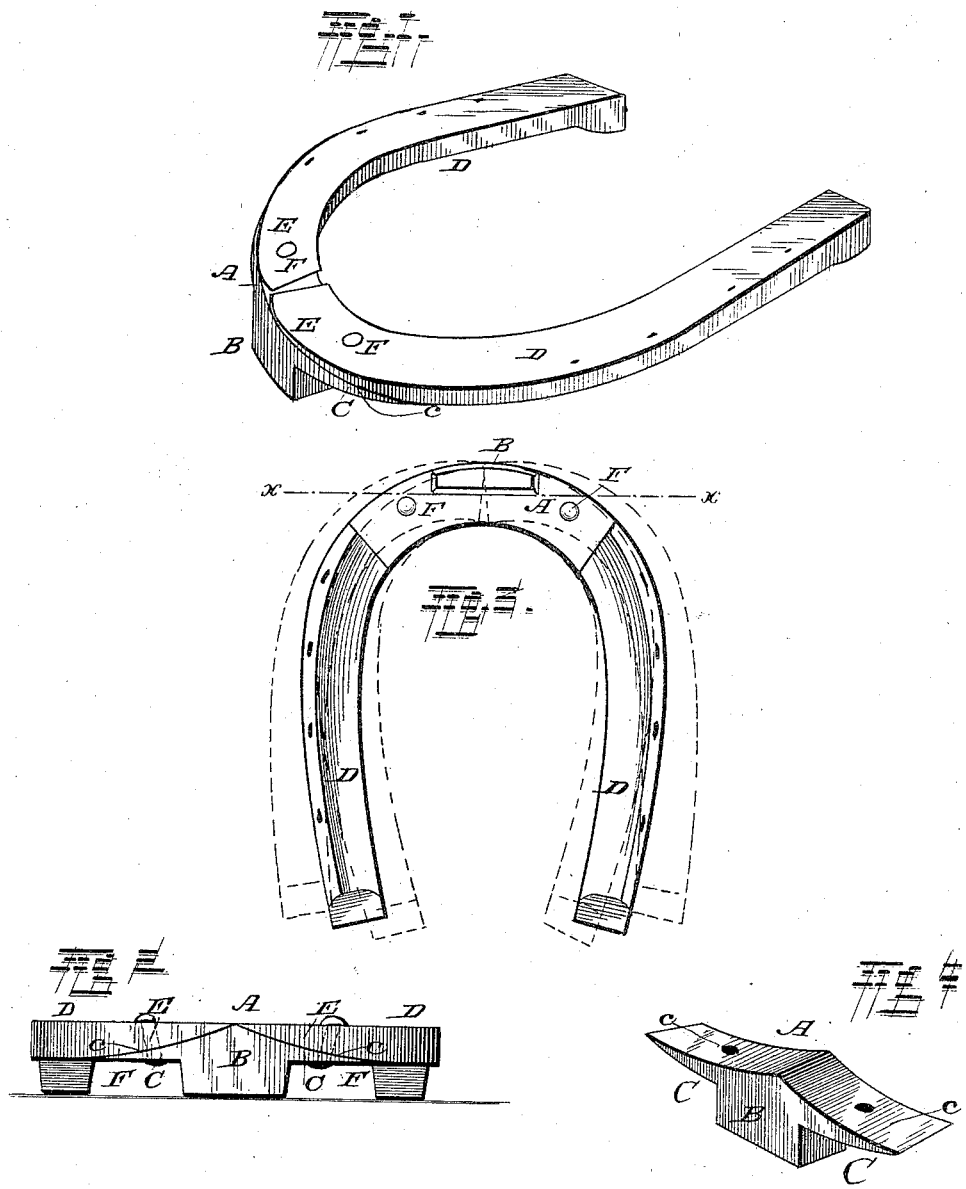

JESSE M. KEITH, OF MAIDEN ROCK, WISCONSIN.

HORSESHOE.

SPECIFICATION forming part of Letters Patent No. 307,397, dated October 28, 1884.

Application filed April 15, 1884. (No model.)

*To all whom it may concern:*

Be it known that I, JESSE M. KEITH, a citizen of the United States, and a resident of Maiden Rock, in the county of Pierce and State of Wisconsin, have invented certain new and useful Improvements in Horseshoes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved horseshoe. Fig. 2 is a front view of the same. Fig. 3 is a bottom view. Fig. 4 is a perspective view of the toe-piece detached; and Fig. 5 is a sectional view on line $x\,x$, Fig. 3.

Similar letters of reference indicate corresponding parts in all the figures.

My invention has relation to that class of horseshoes in which the quarters of the shoe are movably connected to the toe-piece; and it consists in the improved construction and combination of parts of the same, as hereinafter more fully described and claimed.

In the accompanying drawings, the letter A indicates the toe-piece, which may be provided with a calk, B, integral with the same, or secured upon it in any suitable manner, and the ends C of the toe-piece are wedge-shaped, having inclined upper surfaces, $c$, diverging from the middle of the toe-piece.

The quarters D of the shoe may be provided with heel-calks, if desired, and have their forward ends, E, wedge-shaped or tapering upon their lower faces, so as to correspond to the inclined faces of the toe-piece, and fit upon the same, and the said quarters are pivoted to the toe-piece by means of bolts, screws, or rivets F, which pass through the tapering ends of the toe-piece and of the quarters at right angles to the inclined faces of the same.

It will be seen that the quarters of the shoe will be forced outward at their free rear ends when the hoof is expanded by the weight of the horse falling upon the hoof, and that the said ends will at the same time be forced slightly downward, thus exerting a downward strain upon the heel and bars of the hoof, which will serve to bring the weight of the horse upon the hoof to not only fall upon the sole of the hoof, which will bear against the ground and expand the hoof, but also fall upon the heel and bars of the hoof, thus dividing the strain upon the hoof and encouraging an even development and growth of the hoof in consequence of an even strain and wear upon the same, and causing the weight and strain to fall more upon the heel and sole of the hoof than upon the toe, which division of weight is the most natural and desirable.

Having thus described my invention, I claim and desire to secure by Letters Patent of the United States—

The combination of a toe-piece, having its upper side inclined from the middle toward its ends, with the quarters having the lower faces of their forward ends beveled or inclined to correspond to the inclines of the toe-piece, and pivoted to the ends of the toe-piece by means of bolts, screws, or rivets passing through the inclined meeting faces at right angles to the same, as and for the purpose shown and set forth.

In testimony that I claim the foregoing as my own I have hereunto affixed my signature in presence of two witnesses.

JESSE M. KEITH.

Witnesses:
D. F. GOODRICH,
J. E. COOPER.